United States Patent
Yamaguchi et al.

(10) Patent No.: US 10,246,574 B2
(45) Date of Patent: Apr. 2, 2019

(54) LIGHT REFLECTIVE PARTS AND REFLECTIVE PARTS FOR AUTOMOBILE LAMP

(71) Applicant: ASAHI KASEI KABUSHIKI KAISHA, Chiyoda-ku, Tokyo (JP)

(72) Inventors: Toru Yamaguchi, Tokyo (JP); Kazuhiko Hashimoto, Tokyo (JP); Chihiro Orimo, Tokyo (JP)

(73) Assignee: ASAHI KASEI KABUSHIKI KAISHA, Chiyoda-ku, Tokyo (JP)

( * ) Notice: Subject to any disclaimer, the term of this patent is extended or adjusted under 35 U.S.C. 154(b) by 0 days.

(21) Appl. No.: 15/723,673

(22) Filed: Oct. 3, 2017

(65) Prior Publication Data

US 2018/0094121 A1 Apr. 5, 2018

Related U.S. Application Data

(63) Continuation of application No. 15/281,792, filed on Sep. 30, 2016, now Pat. No. 9,822,240.

(51) Int. Cl.
*F21V 7/22* (2018.01)
*C08K 5/53* (2006.01)
*C08K 5/5313* (2006.01)
*C08K 5/527* (2006.01)

(52) U.S. Cl.
CPC ........... *C08K 5/5313* (2013.01); *C08K 5/527* (2013.01); *F21V 7/22* (2013.01)

(58) Field of Classification Search
CPC ... C08K 5/09; C08K 5/41; C08K 5/42; C08K 5/53; C08K 5/5313; C08K 5/5317; C08K 5/5333; F21S 8/10; F21S 8/12
See application file for complete search history.

(56) References Cited

U.S. PATENT DOCUMENTS

| | | | |
|---|---|---|---|
| 4,228,064 A | 10/1980 | Izawa et al. | |
| 8,420,719 B2 | 4/2013 | Timberlake et al. | |
| 2012/0071599 A1 | 3/2012 | Yamaguchi et al. | |
| 2013/0267641 A1* | 10/2013 | Yamaguchi | C08K 5/13 |
| | | | 524/323 |

FOREIGN PATENT DOCUMENTS

| | | |
|---|---|---|
| JP | 104117452 A | 4/1992 |
| JP | 2014047343 A | 3/2014 |
| JP | 2016176072 A | 10/2016 |

OTHER PUBLICATIONS

Machine-generated English translation of JP H4-117452 A (Year: 1992).*
Machine translation of JP 2014-047343 A.
Machine translation of JP H4-117452 A.

* cited by examiner

Primary Examiner — Vu A Nguyen
(74) Attorney, Agent, or Firm — Kenja IP Law PC

(57) ABSTRACT

Provided is a molded article in which the formation of depressions in a vapor deposited aluminum surface of the molded article caused by long-term exposure to high-temperature conditions is suppressed such that the vapor deposited aluminum surface has excellent external appearance that has not conventionally been achieved. A light reflective part includes a polyphenylene ether resin composition containing a polyphenylene ether (A) and 9,10-dihydro-9-oxa-10-phosphaphenanthrene-10-oxide or a derivative thereof (B). The (A) component has a content of from 95 mass % to 99.95 mass % and the (B) component has a content of from 0.05 mass % to 5 mass % relative to 100 mass %, in total, of the (A) component and the (B) component.

8 Claims, No Drawings

LIGHT REFLECTIVE PARTS AND REFLECTIVE PARTS FOR AUTOMOBILE LAMP

CROSS-REFERENCE TO RELATED APPLICATIONS

This application is a continuation application of U.S. patent application Ser. No. 15/281,792, filed on Sep. 30, 2016, the entire content of which is hereby incorporated herein by reference.

TECHNICAL FIELD

The present disclosure relates to light reflective parts and reflective parts for automobile lamps.

BACKGROUND

Polyphenylene ether resins have various properties such as excellent mechanical properties, electrical properties, acid and alkali resistance, and heat resistance, low specific gravity and water absorptivity, and good dimensional stability, and are thus widely used as materials in consumer electronics, office automation devices, office equipment, information devices, automobiles, and so forth. In recent years, polyphenylene ether resin compositions have also been considered for application in automobile head lamps and also light reflective molded articles that are used in projectors, various lighting equipment, and the like. Parts that are used in applications such as described above are normally surface treated by aluminum vapor deposition prior to use, and there is demand for surface smoothness of a mirror surface of vapor deposited aluminum to be maintained even upon long-term exposure to high-temperature conditions.

However, it has been found that in a situation in which a metal such as aluminum is vapor deposited on a molded article surface formed from a conventional polyphenylene ether resin, the smoothness of the surface is reduced upon long-term exposure of the surface to high-temperature conditions. The cause of this reduction in surface smoothness is thought to be due to the fact that although the entire surface of a molded article appears to be uniformly covered by a vapor deposited aluminum film, there are locations appearing like extremely fine pin holes where the surface of the molded article is not covered by the vapor deposited aluminum film, and upon long-term exposure of these locations to high temperatures, depressions form at these locations such that eventually a large number of depressions that are large enough to be visibly identifiable are formed in the surface of the molded article.

PTL 1, for example, describes a light reflective part for which the occurrence of white spots after aluminum vapor deposition is suppressed.

Moreover, PTL 2 discloses a technique relating to a resin composition that contains a polyphenylene ether resin and a compound such as 9,10-dihydro-9-oxa-10-phosphaphenanthrene-10-oxide. It is disclosed that the technique described in PTL 2 can suppress discoloration due to heat during extrusion processing.

CITATION LIST

Patent Literature

PTL 1: JP 2014-47343 A
PTL 2: JP H4-117452 A

SUMMARY

However, in the case of conventional products such as described in PTL 1, is has not been possible to prevent the formation of depressions upon long-term exposure to high temperatures as described above. Moreover, since the resin composition in PTL 2 includes a sulfur-containing heat stabilizer as an essential component, there have been instances in which problems such as corrosion of metal parts have occurred when aluminum vapor deposition has been performed with respect to the resin composition in PTL 2.

Accordingly, an objective of the present disclosure is to provide light reflective parts and reflective parts for automobile lamps formed from a polyphenylene ether resin composition for which deterioration in external appearance of a vapor deposited aluminum surface of a molded article that is caused by the formation of depressions in the vapor deposited aluminum surface upon long-term exposure to high-temperature conditions is significantly suppressed without causing problems such as corrosion of metal parts.

The inventors conducted diligent investigation in order to solve the problems described above and, as a result, discovered that through use, in a light reflective part, of a resin composition containing a prescribed amount of a prescribed compound in a polyphenylene ether, the formation of depressions in the surface of an aluminum vapor deposited molded article due to long-term exposure to high-temperature conditions is suppressed and, consequently, the development of external appearance defects in the vapor deposited aluminum surface of the molded article is significantly suppressed. This discovery led to the present disclosure.

Specifically, the following are disclosed herein.

[1]

A light reflective part comprising a polyphenylene ether resin composition containing a polyphenylene ether (A), and 9,10-dihydro-9-oxa-10-phosphaphenanthrene-10-oxide or a derivative thereof (B), wherein the (A) component has a content of from 95 mass % to 99.95 mass % and the (B) component has a content of from 0.05 mass % to 5 mass % relative to 100 mass %, in total, of the (A) component and the (B) component.

[2]

The light reflective part described in [1], wherein the polyphenylene ether resin composition further contains from 0.05 mass % to 5 mass % of an antioxidant (C) relative to 100 mass % of the polyphenylene ether resin composition.

[3]

The light reflective part described in [2], wherein the antioxidant (C) is a phosphite antioxidant having a structure in chemical formula (5), shown below, in molecules thereof.

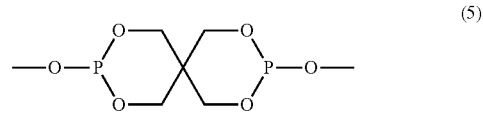

(5)

[4]

The light reflective part described in [1], wherein the polyphenylene ether resin composition further contains from 5 mass % to 50 mass % of a styrene resin relative to 100 mass % of the polyphenylene ether resin composition.

[5]

The light reflective part described in [1], wherein the polyphenylene ether resin composition further contains from 1 mass % to 15 mass % of an elastomer component relative to 100 mass % of the polyphenylene ether resin composition.

[6]

A reflective part for an automobile lamp comprising the light reflective part described in [1].

[7]

A molded article for a reflector part of an automobile lamp, the molded article comprising the reflective part for an automobile lamp described in [6].

[8]

A molded article for an extension part of an automobile lamp, the molded article comprising the reflective part for an automobile lamp described in [6].

In the presently disclosed light reflective part, the formation of depressions in the surface of an aluminum vapor deposited molded article caused by long-term exposure to high-temperature conditions is suppressed such that the vapor deposited aluminum surface has excellent external appearance that has not conventionally been achieved. Therefore, the presently disclosed light reflective part can be favorably used for applications such as reflectors and extension moldings for automobile lamps.

DETAILED DESCRIPTION

An embodiment of this disclosure (hereinafter referred to as "the present embodiment") is described below in detail. However, the present disclosure is not limited to the following embodiment and may be implemented with various alterations that are within the essential scope thereof.

<<Resin Composition>>

A polyphenylene ether resin composition that is used in a light reflective part according to the present embodiment contains a polyphenylene ether (A) and at least one compound (B) selected from the group consisting of: an organophosphorus compound having a chemical structure in formula (I) or (II), shown below, in molecules thereof (R in formula (II) is a trivalent saturated hydrocarbon group having a carbon number of 1-8 or a trivalent aromatic hydrocarbon group having a carbon number of 6-12); phosphonic acids, phosphonic acid esters, phosphinic acids, and phosphinic acid esters other than the organophosphorus compound; monocarboxylic acids; sulfonic acids; and sulfinic acids. The (A) component has a content of from 95 mass % to 99.95 mass % and the (B) component has a content of from 0.05 mass % to 5 mass % relative to 100 mass %, in total, of the (A) component and the (B) component.

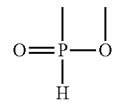

(I)

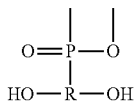

(II)

The inventors discovered that a resin composition containing the (A) component and the (B) component described above in the prescribed ratio can be used to obtain a molded article for which the formation of depressions in a vapor deposited aluminum surface of the molded article caused by long-term exposure to high-temperature conditions is suppressed such that the vapor deposited aluminum surface has excellent external appearance that has not conventionally been achieved. The inventors also discovered that such a molded article is sufficiently applicable as a molding for a light reflective part such as a reflector or an extension molding of an automobile lamp.

The following provides a detailed description of each component of the resin composition.

<Polyphenylene Ether (A)>

The polyphenylene ether (A) used in the present embodiment has formula (III) and/or (IV), shown below, as a repeating unit and is preferably a homopolymer or copolymer in which constitutional units are formed by general formula (III) and/or (IV).

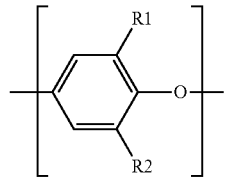

(III)

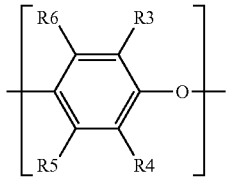

(IV)

In formulae (III) and (IV), R1, R2, R3, R4, R5, and R6 are, independently of one another, preferably each a monovalent residue such as an alkyl group having a carbon number of 1-4, an aryl group having a carbon number of 6-12, an alkyl halide group having a carbon number of 1-4, a hydroxyalkyl group having a carbon number of 1-4, a halogen, or hydrogen. However, R5 and R6 are not both simultaneously hydrogen. The carbon number of the alkyl group is more preferably 1-3 and the carbon number of the aryl group is more preferably 6-8. Moreover, among these monovalent residues, hydrogen is more preferable. It should be noted that the number of repetitions of the repeating units in formulae (III) and (IV) varies depending on the molecular weight distribution of the polyphenylene ether (A) and is not specifically limited.

Examples of polyphenylene ether homopolymers that can be used include, but are not limited to, poly(2,6-dimethyl-1,4-phenylene ether), poly(2-methyl-6-ethyl-1,4-phenylene ether), poly(2,6-diethyl-1,4-phenylene ether), poly(2-ethyl-6-n-propyl-1,4-phenylene ether), poly(2,6-di-n-propyl-1,4-phenylene ether), poly(2-methyl-6-n-butyl-1,4-phenylene ether), poly(2-ethyl-6-isopropyl-1,4-phenylene ether), poly(2-methyl-6-chloroethyl-1,4-phenylene ether), poly(2-methyl-6-hydroxyethyl-1,4-phenylene ether). Among these homopolymers, poly(2,6-dimethyl-1,4-phenylene ether) is preferable from a viewpoint of processability and ease of raw material acquisition.

Examples copolymers that can be used as the polyphenylene ether (A) include, but are not limited to, copolymers having a polyphenylene ether structure as a main part thereof such as a copolymer of 2,6-dimethylphenol and 2,3,6-trimethylphenol, a copolymer of 2,6-dimethylphenol and o-cresol, and a copolymer of 2,3,6-trimethylphenol and o-cresol. Among these copolymers, a copolymer of 2,6-dimethylphenol and 2,3,6-trimethylphenol is preferable from a viewpoint of processability and ease of raw material acquisition, and a copolymer of from 70 mass % to 90 mass % of 2,6-dimethylphenol and from 10 mass % to 30 mass % of 2,3,6-trimethylphenol is more preferable from a viewpoint of enhancing physical properties.

The polyphenylene ether (A) preferably includes at least one structural unit selected from the group consisting of chemical formulae (1) and (2), shown below.

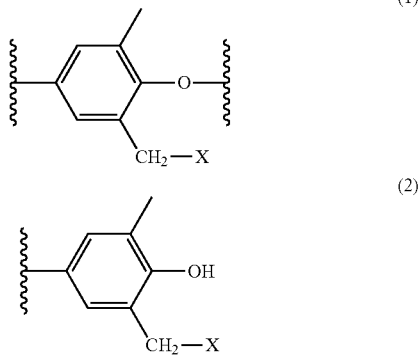

Note that X in chemical formulae (1) and (2) is a group selected from

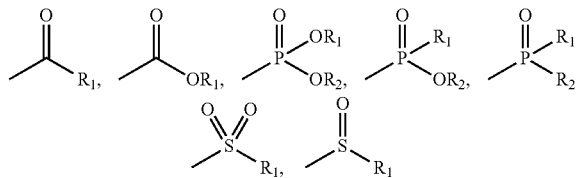

and $R_1$ and $R_2$ in X are each, independently of one another, a substituent having a carbon number of at least 1, such as a chain-shaped or cyclic alkyl group.

In terms of structure, $R_1$ and $R_2$ are preferably each a substituent that does not include a reactive functional group. The reason for this is that in a situation in which a reactive substituent is present, the reactive substituent may cause a crosslinking reaction to occur upon long-term exposure of the resin composition to high temperatures, and this may lead to deterioration of external appearance of a vapor deposited aluminum mirror surface of a molded article. Examples of the reactive substituent mentioned above include a hydroxy group, an alkoxy group, an amino group, a vinyl group, and a carbonyl group. Furthermore, $R_1$ and $R_2$ may have a connected structure or may include a nitrogen atom or an oxygen atom in the structure thereof.

The following describes the action and effect of the polyphenylene ether including at least one structural unit selected from chemical formulae (1) and (2).

In the case of a conventional polyphenylene ether, a methyl group of a terminal unit (hereinafter, also referred to as a "terminal methyl group") or a methyl group of an intermediate unit (hereinafter, also referred to as a "side-chain methyl group") may cause an oxidative crosslinking reaction to occur upon long-term exposure of the polyphenylene ether to high temperatures. The inventors focused on this oxidative crosslinking reaction of terminal methyl groups, side-chain methyl groups, and so forth, and investigated the possibility that suppressing this oxidative crosslinking reaction may enable further suppression of the formation of depressions in a vapor deposited aluminum surface and also enable further suppression of the deterioration of external appearance of a vapor deposited aluminum mirror surface caused by the development such depressions. The inventors realized that radicals are comparatively likely to be formed at terminal methyl groups and side-chain methyl groups and that radicals formed in this manner may cause oxidative crosslinking. It was discovered that a crosslinking reaction of a terminal methyl group or a side-chain methyl group can be suppressed in the polyphenylene ether including at least one structural unit selected from chemical formulae (1) and (2) as a consequence of the terminal methyl group or side-chain methyl group, which acts as an oxidized moiety, being blocked through substitution with a specific molecule, and, as a result, the external appearance of a vapor deposited aluminum mirror surface of the light reflective part after long-term exposure to high temperatures can be further improved.

The chain of the polyphenylene ether (A) preferably includes from 0.05 to 10 structural units represented by either of chemical formulae (1) and (2) per 100 monomer units forming the polyphenylene ether. As a result of the number of structural units represented by either of chemical formulae (1) and (2) being at least 0.05 units per 100 units, external appearance of a vapor deposited aluminum surface of a molding after long-term exposure to high temperatures can be sufficiently improved and as a result of the number of structural units represented by either of chemical formulae (1) and (2) being no greater than 10 units per 100 units, mechanical properties can be easily maintained. The number of structural units represented by either of chemical formulae (1) and (2) per 100 units is more preferably in a range of from 0.1 units to 10 units, further preferably in a range of from 0.1 units to 3.0 units, and particularly preferably in a range of from 0.1 units to 1.0 units.

From a viewpoint of further improving external appearance of a vapor deposited aluminum surface of a molding after long-term exposure to high temperatures, the polyphenylene ether (A) preferably includes at least one structural unit selected from the group consisting of chemical formulae (3) and (4).

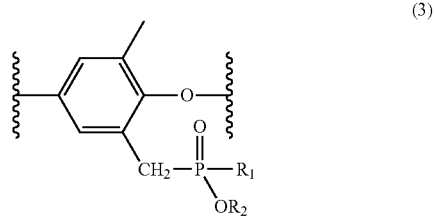

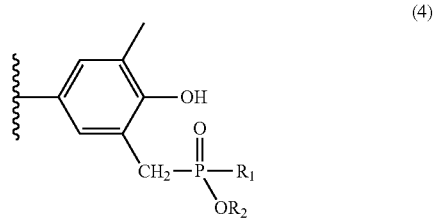

R₁ and R₂ in chemical formulae (3) and (4) are each, independently of one another, a substituent other than hydrogen and, in the same way as described above, are each preferably a substituent having a carbon number of at least 1, and are more preferably each a chain-shaped or cyclic alkyl group having a carbon number of at least 1.

—Synthesis Method of Polyphenylene Ether (A)—

The polyphenylene ether (A) can be selected from a wide range of polymer powders of normal polyphenylene ethers synthesized by polymerization methods that are already commonly known.

Among such polyphenylene ethers, the polyphenylene ether including at least one structural unit selected from the group consisting of chemical formulae (1) and (2) is preferably synthesized by using a polyphenylene ether having a different substituent to X in chemical formulae (1) and (2) on the methylene group in chemical formulae (1) and (2) as a precursor (hereinafter, also referred to as a "precursor polyphenylene ether"), and reacting this precursor with a reactive compound described further below. According to the method described above, since the polyphenylene ether (A) including at least one structural unit selected from the group consisting of chemical formulae (1) and (2) is synthesized from the precursor polyphenylene ether, the polyphenylene ether (A) can be obtained more efficiently than in a method in which the polyphenylene ether (A) is synthesized from a polyphenylene ether that, compared to the polyphenylene ether (A), has hydrogen in place of the X part in chemical formulae (1) and (2) (hereinafter, also referred to as an "unsubstituted polyphenylene ether").

The precursor polyphenylene ether that is used preferably includes structural units having a terminal group and a side-chain group represented by chemical formulae (7) and (8), shown below, in an unsubstituted polyphenylene ether chain. As a result of the precursor polyphenylene ether including the structural unit in chemical formulae (7), shown below, and/or the structural unit in chemical formula (8), shown below, the polyphenylene ether including at least one structural unit selected from chemical formulae (1) and (2) can be obtained with sufficient efficiency (specifically, in production of a polyphenylene ether, a polyphenylene ether including at least one structural unit selected from chemical formulae (1) and (2) can be produced via the precursor polyphenylene ether with sufficient efficiency because the CH₂—Y part of the structures in chemical formulae (7) and (8) is selectively cleaved and undergoes a substitution reaction with a reactive compound described further below). Moreover, since the precursor polyphenylene ether can be easily synthesized from an unsubstituted polyphenylene ether, it is efficient to synthesize the polyphenylene ether including at least one structural unit selected from chemical formulae (1) and (2) via the precursor polyphenylene ether.

The total number of structural units such as described above in the polyphenylene ether chain of the precursor polyphenylene ether is preferably from 0.05 units to 10 units per 100 units of the polyphenylene ether chain, more preferably from 0.1 units to 10 units, even more preferably from 0.1 units to 3.0 units, and particularly preferably from 0.1 units to 1.0 units.

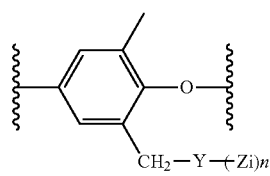

(7)

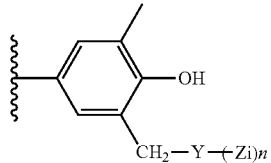

(8)

(In chemical formulae (7) and (8), Y represents a N atom or an O atom and Zi represents a saturated or unsaturated hydrocarbon group that has a carbon number 1-20 and that is cyclic or chain-shaped (linear or branched). Moreover, i and n are each an integer of 1 or 2, where Z1 and Z2 may be the same or different and may be connected to one another.)

No specific limitations are placed on the method used to produce the precursor polyphenylene ether including the structural units in chemical formulae (7) and (8). Examples of methods that can be used include a method in which an (a1) compound such as an amine, an alcohol, or morpholine is added and caused to react in a polymerization reaction of a polyphenylene ether and a method in which an unsubstituted polyphenylene ether that has been polymerized is stirred at from 20° C. to 60° C., and preferably at 40° C., in a solvent such as toluene in which the polyphenylene ether is soluble, and the aforementioned (a1) compound is added thereto and is caused to react.

Although no specific limitations are placed on the (a1) compound, specific examples thereof include primary amines such as n-propylamine, isopropylamine, n-butylamine, isobutylamine, sec-butylamine, n-hexylamine, n-octylamine, 2-ethylhexylamine, cyclohexylamine, laurylamine, and benzylamine; secondary amines such as diethylamine, di-n-propylamine, di-n-butylamine, diisobutylamine, di-n-octylamine, piperidine, and 2-pipecoline; alcohols such as methanol, ethanol, n-propanol, isopropanol, n-butanol, isobutanol, and sec-butanol; and morpholine.

No specific limitations are placed on the method used to obtain the polyphenylene ether including at least one structural unit selected from chemical formulae (1) and (2). Examples of methods that can be used include a method in which a reactive compound described further below is added in polymerization of a polyphenylene ether and polymerization of the polyphenylene ether is carried out, a method in which a small amount of a monomer substituted with a reactive compound described further below is added in polymerization of a polyphenylene ether and polymerization of the polyphenylene ether is carried out, and a method in which an unsubstituted polyphenylene ether and a reactive compound are melt-kneaded and caused to react. More specific examples include a method in which the aforementioned (a1) compound is added and caused to react in polymerization of a polyphenylene ether, and a reactive compound described further below is subsequently caused to react, a method in which a small amount of 2,6-dimethylphenol that has been substituted with the aforementioned (a1) compound is added and caused to react in polymerization of a polyphenylene ether, and melt-kneading and reaction with a reactive compound is subsequently carried out, and a method in which a precursor polyphenylene ether is obtained and the precursor polyphenylene ether and a reactive compound are subsequently melt-kneaded and caused to react (i.e., the precursor polyphenylene ether and the reactive compound are for example melt-kneaded in production of a resin composition by melt kneading using the precursor polyphenylene ether).

——Reactive Compound——

Examples of reactive compounds that can be used to obtain the polyphenylene ether including at least one structural unit selected from chemical formulae (1) and (2) include, but are not limited to, phosphonic acids, phosphonic acid esters, phosphinic acids, phosphinic acid esters, monocarboxylic acids, sulfonic acids, and sulfinic acids.

Examples of phosphonic acids that can be used as the reactive compound include phosphonic acid, methylphosphonic acid, ethylphosphonic acid, vinylphosphonic acid, decylphosphonic acid, phenylphosphonic acid, benzylphosphonic acid, aminomethylphosphonic acid, methylenediphosphonic acid, 1-hydroxyethane-1,1-diphosphonic acid, 4-methoxyphenylphosphonic acid, and propylphosphonic anhydride.

Examples of phosphonic acid esters that can be used as the reactive compound include dimethyl phosphonate, diethyl phosphonate, bis(2-ethylhexyl) phosphonate, dioctyl phosphonate, dilauryl phosphonate, dioleyl phosphonate, diphenyl phosphonate, dibenzyl phosphonate, dimethyl methylphosphonate, diphenyl methylphosphonate, dioctyl methylphosphonate, diethyl ethylphosphonate, dioctyl ethylphosphonate, diethyl benzylphosphonate, dimethyl phenylphosphonate, diethyl phenylphosphonate, dipropyl phenylphosphonate, dioctyl phenylphosphonate, diethyl (methoxymethyl)phosphonate, dioctyl (methoxymethyl) phosphonate, diethyl vinylphosphonate, diethyl hydroxymethylphosphonate, dimethyl (2-hydroxyethyl)phosphonate, dioctyl (methoxymethyl)phosphonate, diethyl p-methylbenzylphosphonate, dioctyl p-methylbenzylphosphonate, diethylphosphonoacetate, ethyl diethylphosphonoacetate, tert-butyl diethylphosphonoacetate, dioctyl diethylphosphonate, diethyl (4-chlorobenzyl)phosphonate, dioctyl (4-chlorobenzyl)phosphonate, diethyl cyanophosphonate, diethyl cyanomethylphosphonate, dioctyl cyanophosphonate, diethyl 3,5-di-tert-butyl-4-hydroxybenzylphosphonate, dioctyl 3,5-di-tert-butyl-4-hydroxybenzylphosphonate, and diethyl (methylthiomethyl)phosphonate.

Examples of phosphinic acids that can be used as the reactive compound include dimethylphosphinic acid, ethylmethylphosphinic acid, diethylphosphinic acid, methyl-n-propylphosphinic acid, diphenylphosphinic acid, dioleylphosphinic acid, 9,10-dihydro-9-oxa-10-phosphaphenanthrene-10-oxide, and derivatives thereof.

Examples of phosphinic acid esters that can be used as the reactive compound include methyl dimethylphosphinate, ethyl dimethylphosphinate, n-butyl dimethylphosphinate, cyclohexyl dimethylphosphinate, vinyl dimethylphosphinate, phenyl dimethylphosphinate, methyl ethylmethylphosphinate, ethyl ethylmethylphosphinate, n-butyl ethylmethylphosphinate, cyclohexyl ethylmethylphosphinate, vinyl ethylmethylphosphinate, phenyl ethylmethylphosphinate, methyl diethylphosphinate, ethyl diethylphosphinate, n-butyl diethylphosphinate, cyclohexyl diethylphosphinate, vinyl diethylphosphinate, phenyl diethylphosphinate, methyl diphenylphosphinate, ethyl diphenylphosphinate, n-butyl diphenylphosphinate, cyclohexyl diphenylphosphinate, vinyl diphenylphosphinate, phenyl diphenylphosphinate, methyl methyl-n-propylphosphinate, ethyl methyl-n-propylphosphinate, n-butyl methyl-n-propylphosphinate, cyclohexyl methyl-n-propylphosphinate, vinyl methyl-n-propylphosphinate, phenyl methyl-n-propylphosphinate, methyl dioleylphosphinate, ethyl dioleylphosphinate, n-butyl dioleylphosphinate, cyclohexyl dioleylphosphinate, vinyl dioleylphosphinate, and phenyl dioleylphosphinate.

Examples of monocarboxylic acids that can be used as the reactive compound include monocarboxylic acids such as formic acid, acetic acid, propionic acid, butyric acid, hexanoic acid, heptanoic acid, octanoic acid, nonanoic acid, decanoic acid, dodecanoic acid, tetradecanoic acid, octadecanoic acid, docosanoic acid, hexacosanoic acid, octadecenoic acid, docosenoic acid, and isooctadecanoic acid; alicyclic monocarboxylic acids such as cyclohexane carboxylic acid; aromatic monocarboxylic acids such as benzoic acid and methylbenzoic acid; hydroxy aliphatic monocarboxylic acids such as hydroxypropionic acid, hydroxyoctadecanoic acid, and hydroxyoctadecenoic acid; and sulfur-containing aliphatic monocarboxylic acids such as alkyl thiopropionic acid.

Examples of sulfonic acids that can be used as the reactive compound include alkyl sulfonic acids, benzenesulfonic acid, naphthalenesulfonic acid, anthraquinonesulfonic acid, camphorsulfonic acid, and derivatives of the preceding sulfonic acids. These sulfonic acids may be monosulfonic acids, disulfonic acids, or trisulfonic acids. Examples of derivatives of alkyl sulfonic acids that can be used include methanesulfonyl chloride. Examples of derivatives of benzenesulfonic acid that can be used include phenolsulfonic acid, styrenesulfonic acid, toluenesulfonic acid, and dodecylbenzenesulfonic acid. Examples of derivatives of naphthalenesulfonic acid that can be used include 1-naphthalenesulfonic acid, 2-naphthalenesulfonic acid, 1,3-naphthalenedisulfonic acid, 1,3,6-naphthalenetrisulfonic acid, and 6-ethyl-1-naphthalenesulfonic acid. Examples of derivatives of anthraquinonesulfonic acid that can be used include anthraquinone-1-sulfonic acid, anthraquinone-2-sulfonic acid, anthraquinone-2,6-disulfonic acid, and 2-methylanthraquinone-6-sulfonic acid.

Examples of sulfinic acids that can be used as the reactive compound include alkane sulfinic acids such as ethanesulfinic acid, propanesulfinic acid, hexanesulfinic acid, octanesulfinic acid, decanesulfinic acid, and dodecanesulfinic acid; alicyclic sulfinic acids such as cyclohexanesulfinic acid and cyclooctanesulfinic acid; and aromatic sulfinic acids such as benzenesulfinic acid, o-toluenesulfinic acid, p-toluenesulfinic acid, ethylbenzenesulfinic acid, decylbenzenesulfinic acid, dodecylbenzenesulfinic acid, chlorobenzenesulfinic acid, and naphthalenesulfinic acid.

From a viewpoint of reactivity, the reactive compound is preferably a phosphorus-containing compound. Specifically, the reactive compound is preferably diphenyl phosphonate, dioleyl phosphonate, dioctyl phosphonate diphenylphosphinic acid, or dioleylphosphinic acid, and is more preferably 9,10-dihydro-9-oxa-10-phosphaphenanthrene-10-oxide. A polyphenylene ether including at least one structural unit selected from chemical formulae (1) and (2) that is obtained using 9,10-dihydro-9-oxa-10-phosphaphenanthrene-10-oxide enables even better improvement of external appearance of a vapor deposited aluminum surface of a molding after long-term exposure to high temperatures.

One type of polyphenylene ether (A) may be used individually, or two or more types of polyphenylene ethers (A) may be used together.

The reduced viscosity of the polyphenylene ether (A) used in the present embodiment is preferably in a range of from 0.25 dL/g to 0.55 dL/g. The reduced viscosity is more preferably in a range of from 0.30 dL/g to 0.50 dL/g, and even more preferably in a range of from 0.35 dL/g to 0.45 dL/g. The reduced viscosity of the polyphenylene ether is preferably at least 0.25 dL/g from a viewpoint of sufficiently maintaining mechanical properties, and in particular tensile strength, and is preferably no greater than 0.55 dL/g from a viewpoint of molding processability and brightness of a molding. Note that in the present embodiment, the reduced viscosity is a value obtained by measurement at 30° C. using a 0.5 g/dL solution and chloroform solvent.

The ratio (Mw/Mn) of the weight average molecular weight Mw and the number average molecular weight Mn of the polyphenylene ether (A) used in the present embodiment, prior to heating processing by extrusion or the like (i.e., in the form of a polymer powder), is preferably from 1.2 to 3.0, more preferably from 1.5 to 2.5, and even more preferably from 1.8 to 2.3. The value of Mw/Mn is preferably at least 1.2 from a viewpoint of molding processability of the resin composition and is preferably no greater than 3.0 from a viewpoint of maintaining mechanical properties of the resin composition, and in particular tensile strength. The weight average molecular weight Mw and the number average molecular weight Mn are values obtained from polystyrene-converted molecular weight measured by GPC (gel permeation chromatography).

The content of the polyphenylene ether (A) used in the present embodiment among 100 mass %, in total, of the (A) and (B) components is in a range of from 95 mass % to 99.95 mass %, preferably in a range of from 95 mass % to 99.9 mass %, and more preferably in a range of from 96 mass % to 99.9 mass %. The content of the polyphenylene ether (A) is preferably at least 95 mass % from a viewpoint of sufficiently maintaining mechanical properties and maintaining molded article external appearance, and is preferably no greater than 99.95 mass % from a viewpoint of maintaining properties required for the applications described herein and sufficiently improving the surface of an aluminum vapor deposited molded article.

<Compound (B)>

Examples of the organophosphorus compound having a chemical structure in formula (I) or (II) in molecules thereof; phosphonic acids, phosphonic acid esters, phosphinic acids, and phosphinic acid esters other than the organophosphorus compound; monocarboxylic acids; sulfonic acids; and sulfinic acids that may be used as the compound (B) include the same phosphonic acids, phosphonic acid esters, phosphinic acids, phosphinic acid esters, monocarboxylic acids, sulfonic acids, and sulfinic acids as described above for the reactive compound.

The compound (B) used in the present embodiment is preferably an organophosphorus compound and more preferably an organophosphorus compound including a reaction group in formula (I) or (II), shown below, in molecules thereof from a viewpoint of sufficient performance being exhibited in order to achieve the objectives of the present application.

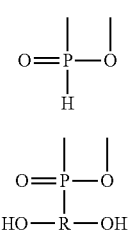

R in formula (II) is a trivalent saturated hydrocarbon group having a carbon number of 1-8 or a trivalent aromatic hydrocarbon group having a carbon number of 6-12.

From a viewpoint of even better improvement of external appearance of a vapor deposited aluminum surface of a molding after long-term exposure to high temperatures, the organophosphorus compound having a chemical structure in formula (I) or (II) in molecules thereof, which is used in the present embodiment, is preferably 9,10-dihydro-9-oxa-10-phosphaphenanthrene-10-oxide, a derivative thereof, or dioctyl phosphonate.

Examples of derivatives of 9,10-dihydro-9-oxa-10-phosphaphenanthrene-10-oxide include 10-(2,5-dihydroxyphenyl)-9,10-dihydro-9-oxa-10-phosphaphenanthrene-10-oxide and bis(2-hydroxyethyl)2-(10H-9-oxa-10-phospha-10-phenanthryl methyl)succinate P-oxide.

Among these examples, 9,10-dihydro-9-oxaphaphenanthrene-10-oxide is more preferably used from a viewpoint of sufficiently improving resistance to heat aging.

The content of the (B) component used in the present embodiment among 100 mass %, in total, of the (A) and (B) components is in a range of from 0.05 mass % to 5 mass %, preferably in a range of from 0.1 mass % to 5 mass %, and more preferably in a range of from 0.1 mass % to 4 mass %. The content of the (B) component is preferably no greater than 5 mass % from a viewpoint of maintaining mechanical properties and molded article external appearance, and is preferably at least 0.05 mass % from a viewpoint of sufficiently suppressing formation of depressions in the surface of an aluminum vapor deposited molded article.

<Antioxidant (C)>

The resin composition used in the light reflective part according to the present embodiment may further contain an antioxidant (C).

Primary antioxidants that act as radical chain inhibitors and secondary antioxidants that have an effect of breaking down peroxides can both be used as the antioxidant (C). In other words, through the use of antioxidants, radicals that may arise at terminal methyl groups and side-chain methyl groups upon long-term exposure of the polyphenylene ether to high temperatures can be captured (primary antioxidant) and peroxides that may arise at terminal methyl groups and side-chain methyl groups due to the aforementioned radicals can be broken down (secondary antioxidant). Accordingly, oxidative crosslinking of the polyphenylene ether can be prevented.

Hindered phenol antioxidants can mainly be used as primary antioxidants. Specific examples of hindered phenol antioxidants that can be used include 2,6-di-t-butyl-4-methylphenol, pentaerythritol tetrakis[3-(3,5-di-t-butyl-4-hydroxyphenyl)propionate], n-octadecyl-3-(3,5-di-t-butyl-4-hydroxyphenyl)propionate, 2,2'-methylenebis(4-methyl-6-t-butylphenol), 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 4,4'-butylidenebis(3-methyl-6-t-butylphenol), alkylated bisphenol, tetrakis[methylene-3-(3,5-di-t-butyl-4-hydroxyphenyl)propionate]methane, and 3,9-bis[2-{3-(3-t-butyl-4-hydroxy-5-methylphenyl)-propionyloxy}-1,1-dim ethylethyl]-2,4,8,10-tetraoxyspiro[5,5]undecane.

Phosphorus-containing antioxidants can mainly be used as secondary antioxidants. Specific examples of phosphorus-containing antioxidants that can be used include trisnonylphenyl phosphite, triphenyl phosphite, tris(2,4-di-t-butylphenyl) phosphite, bis(2,4-di-t-butylphenyl)pentaerythritoldiphosphite, bis(2,6-di-t-butyl-4-methylphenyl)

pentaerythritol-diphosphite, and 3,9-bis(2,6-di-tert-butyl-4-methylphenoxy)-2,4,8,10-tetraoxa-3,9-diphosphaspiro[5,5]undecane.

Furthermore, examples of other antioxidants that can be used together with the antioxidants described above include metal oxides such as zinc oxide and magnesium oxide.

Among these antioxidants, a phosphorus-containing antioxidant that acts as a secondary antioxidant is preferable, a phosphite antioxidant is more preferable, and a phosphite antioxidant having the structure in chemical formula (5), shown below, in molecules thereof is particularly preferable in order to further improve external appearance of a vapor deposited aluminum surface of the light reflective part after long-term exposure to high temperatures.

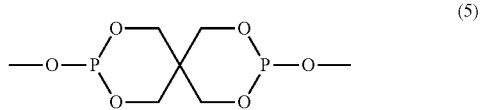

(5)

The content of the antioxidant (C) relative to 100 mass % of the polyphenylene ether resin composition is preferably from 0.05 mass % to 5 mass %, more preferably from 0.1 mass % to 3.0 mass %, and even more preferably from 0.1 mass % to 1.5 mass %. The content of the antioxidant (C) is preferably at least 0.05 mass % from a viewpoint of further improving the external appearance of a vapor deposited aluminum surface of a molding after long-term exposure to high temperatures and is preferably no greater than 5 mass % from a viewpoint of maintaining the external appearance of the surface of a molded article prior to aluminum vapor deposition.

The content of the antioxidant (C) relative to the polyphenylene ether (A) (100 parts by mass) is preferably from 0.1 parts by mass to 3.0 parts by mass, and more preferably from 0.1 parts by mass to 1.5 parts by mass. Addition of at least 0.1 parts by mass of the antioxidant (C) is preferable from a viewpoint of further improving the external appearance of a vapor deposited aluminum surface of a molding after long-term exposure to high temperatures and addition of no greater than 3.0 parts by mass of the antioxidant (C) is preferable from a viewpoint of maintaining the external appearance of the surface of a molded article prior to aluminum vapor deposition.

The polyphenylene ether resin composition included in the light reflective part of the present embodiment preferably does not contain a sulfur-containing antioxidant from a viewpoint of further suppressing corrosion of metal parts when aluminum vapor deposition is performed and further improving external appearance of a vapor deposited aluminum surface of a molding after long-term exposure to high temperatures.

Examples of sulfur-containing antioxidants include dilauryl 3,3'-thiodipropionate, dimyristyl 3,3'-thiodipropionate, distearyl 3,3'-thiodipropionate, pentaerythritol tetrakis(β-laurylthiopropionate), ditridecyl 3,3'-thiodipropionate, 2-mercaptobenzimidazole, 2,2-thio-diethylene bis[3-(3,5-di-t-butyl-4-hydroxyphenyl)propionate], 2,2-thiobis(4-methyl-6-t-butylphenol), and 2,4-bis(n-octylthio)-6-(4-hydroxy-3,5-di-t-butylanilino)-1,3,5-triazine.

<Styrene Resin>

A styrene resin may be compounded into the resin composition used in the light reflective part of the present embodiment with an objective of adjusting heat resistance and molding fluidity. The styrene resin may, without any specific limitations, be a commonly known styrene resin. For example, the styrene resin may be a homopolymer of a styrene compound or may be a polymer that is obtained by polymerizing a styrene compound with a compound that is copolymerizable therewith, either with or without a rubbery polymer present.

Examples of styrene compounds that can be used include, but are not specifically limited to, styrene, α-methylstyrene, 2,4-dimethylstyrene, monochlorostyrene, p-methylstyrene, p-tert-butylstyrene, and ethylstyrene. Among these styrene compounds, styrene is preferable from a viewpoint of practicality of raw materials.

Examples of compounds that are copolymerizable with a styrene compound include methacrylic acid esters such as methyl methacrylate and ethyl methacrylate; unsaturated nitrile compounds such as acrylonitrile and methacrylonitrile; and acid anhydrides such as maleic anhydride.

Polystyrene is preferable as the styrene resin used in the present embodiment from a viewpoint of miscibility with the polyphenylene ether. Moreover, the polystyrene is preferably general purpose polystyrene from a viewpoint of improving molded article external appearance.

The content of the styrene resin that may be used in the present embodiment among 100 mass % of the resin composition is preferably in a range of from greater than 0 mass % to no greater than 60 mass %, more preferably in a range of from 5 mass % to 50 mass %, and even more preferably in a range of from 10 mass % to 40 mass %. Compounding of the styrene resin (i.e., a styrene resin content of greater than 0 mass %) is preferable from a viewpoint of improving molding fluidity of the resin composition and compounding of the styrene resin with a content of no greater than 60 mass % is preferable from a viewpoint of sufficiently maintaining heat resistance.

<Elastomer Component>

An elastomer component may be further compounded into the resin composition used in the light reflective part of the present embodiment in order to improve impact resistance.

The elastomer component may be any commonly known example thereof. However, from a viewpoint of miscibility with the (A) component and heat resistance, it is preferable that the elastomer component includes a block copolymer having a styrene block and a conjugated diene compound block that has been hydrogenated (hereinafter, also referred to as a "styrene block-hydrogenated conjugated diene compound block copolymer")

From a viewpoint of heat stability, the conjugated diene compound block is preferably a block that has been hydrogenated with a hydrogenation rate of at least 50%, more preferably a block that has been hydrogenated with a hydrogenation rate of at least 80%, and even more preferably a block that has been hydrogenated with a hydrogenation rate of at least 95%.

Examples of the conjugated diene compound block include, but are not limited to, polybutadiene, polyisoprene, poly(ethylene-butylene), poly(ethylene-propylene), and vinyl-polyisoprene. One type of conjugated diene compound block may be used individually, or two or more types of conjugated diene compound blocks may be used in combination.

The arrangement of repeating units composing the block copolymer may be a linear type or a radial type. Moreover, polystyrene blocks and rubber intermediate blocks may form a two, three, or four block structure. Among such block copolymers, a triblock linear-type block copolymer formed by a polystyrene-poly(ethylene-butylene)-polystyrene structure is preferable from a viewpoint of sufficiently exhibiting the effects that are desired in the present embodiment. Note that the conjugated diene compound blocks may include butadiene units in a range of no greater than 30 mass %.

The styrene block-hydrogenated conjugated diene compound block copolymer that may be used in the present embodiment preferably has a weight average molecular weight Mw in a range of from 50,000 to 300,000, more preferably in a range of from 70,000 to 280,000, and even more preferably in a range of from 100,000 to 250,000 from a viewpoint of improving impact resistance. The weight average molecular weight Mw of the styrene block-hydrogenated conjugated diene compound block copolymer is preferably at least 50,000 from a viewpoint of sufficiently imparting impact resistance and is preferably no greater than 300,000 from a viewpoint of fluidity of a molding, maintenance of external appearance, and miscibility.

The styrene block-hydrogenated conjugated diene compound block copolymer that may be used in the present embodiment preferably has a bound styrene content in a range of from 20 mass % to 80 mass %, more preferably in a range of from 30 mass % to 60 mass %, and even more preferably in a range of from 30 mass % to 45 mass %. The bound styrene content of the styrene block-hydrogenated conjugated diene compound block copolymer is preferably at least 20 mass % from a viewpoint of miscibility and is preferably no greater than 80 mass % from a viewpoint of imparting impact resistance.

The content of the elastomer component that may be used in the present embodiment in 100 mass % of the resin composition is preferably in a range of from 1 mass % to 15 mass %, more preferably in a range of from 3 mass % to 12 mass %, and even more preferably in a range of from 5 mass % to 12 mass %. The content of the elastomer component is preferably at least 1 mass % from a viewpoint of imparting impact resistance required for the applications described herein and is preferably no greater than 15 mass % from a viewpoint of heat resistance and maintenance of rigidity.

<Other Components>

Colorants such as carbon black, titanium oxide, and other commonly known inorganic and organic dyes and pigments can be compounded into the resin composition used in the light reflective part of the present embodiment in order to enable coloring.

Among colorants that can be used in the present embodiment, carbon black is particularly preferable from a viewpoint of maintaining the properties required for the applications described herein. From a viewpoint of handleability and improvement of dispersibility in the resin composition, compounding of carbon black into the resin composition is particularly preferably carried out using what is referred to as a master batch formed by premixing carbon black into polystyrene by melt-kneading.

The content of the colorant that may be used in the present embodiment relative to 100 parts by mass, in total, of the resin composition is in a range of from 0.01 parts by mass to 8 parts by mass, preferably in a range of from 0.1 parts by mass to 5 parts by mass, more preferably in a range of from 0.3 parts by mass to 3 parts by mass, and particularly preferably in a range of from 0.4 parts by mass to 2 parts by mass. The content of the colorant is preferably at least 0.01 parts by mass in order to enable sufficient coloring and is preferably no greater than 8 parts by mass from a viewpoint of maintenance of molded article external appearance.

So long as heat resistance and mechanical properties of the resin composition, surface external appearance and heat aging resistance of a molded article, and so forth are not significantly reduced, the resin composition used in the light reflective part of the present embodiment may contain other antioxidants, ultraviolet absorbers, antistatic agents, lubricants, mold release agents, and the like with a content that, relative to 100 parts by mass of the resin composition, is in a range of from 0.001 parts by mass to 3 parts by mass, more preferably in a range of from 0.01 parts by mass to 0.5 parts by mass, and even more preferably in a range of from 0.2 parts by mass to 0.5 parts by mass. The content of other additives such as described above is preferably at least 0.001 parts by mass in order to enable sufficient expression of an additive effect and is preferably no greater than 3 parts by mass from a viewpoint of obtaining an adequate molded article external appearance and maintaining physical properties.

[Method for Producing Resin Composition]

The resin composition used in the light reflective part of the present embodiment can be produced by melt-kneading raw materials such as the (A) component and the (B) component under melt-kneading conditions that are adjusted as appropriate. Although no specific limitations are placed on the conditions adopted in melt-kneading of the (A) component, the (B) component, and other components in order to produce the resin composition, the use of a twin-screw extruder having a screw diameter of from 25 mm to 90 mm is preferable from a viewpoint of enabling large-scale and stable production of a resin composition that sufficiently exhibits the effects that are desired in the present embodiment. For example, in a situation in which a TEM-58SS twin-screw extruder is used (produced by Toshiba Machine Co., Ltd., barrels: 13, screw diameter 58 mm, L/D=53; screw pattern including kneading discs L: 2, kneading discs R: 14, and kneading discs N: 2), melt-kneading may be carried out under conditions of a cylinder temperature of from 270° C. to 330° C., a screw rotation speed of from 150 rpm to 700 rpm, an extrusion rate of from 150 kg/hr to 600 kg/hr, and a vent degree of vacuum of from 11.0 kPa to 1.0 kPa.

The melt-kneading is preferably carried out with an extruded resin temperature in a range of from 250° C. to 380° C. The extruded resin temperature is more preferably in a range of from 270° C. to 360° C., and even more preferably in a range of from 300° C. to 350° C. It is preferable that the extruded resin temperature is at least 250° C. from a viewpoint of extrudability and sufficient expression of the effects required for the applications described herein and it is preferable that the extruded resin temperature is no greater than 380° C. from a viewpoint of extrudability and sufficient maintenance of mechanical properties.

In production of the resin composition used in the present embodiment using a large-scale twin screw extruder (screw diameter of from 40 mm to 90 mm), it is important to be aware that a gel or carbide arising from the (A) component during extrusion may become mixed into extruded resin pellets and cause a reduction in brightness and surface external appearance of a molded article. Therefore, it is preferable that the (A) component is fed from a furthest upstream (top feed) raw material feeding inlet and that the oxygen concentration inside of a chute of the furthest upstream feeding inlet is set as no greater than 15 volume %, more preferably no greater than 8 volume %, and even more preferably no greater than 1 volume %.

The oxygen concentration can be adjusted by sufficiently purging a raw material storage hopper with nitrogen and making sure that a feed line between the raw material storage hopper and the raw material feeding inlet of the extruder is sealed tight so that air does not enter or leave the feed line, and by additionally adjusting the amount of fed nitrogen and the degree of opening of a gas vent.

In production of the resin composition used in the light reflective part of the present embodiment, pellets that are obtained by pre-blending the (A) component and the (B) component and then melt-kneading the blended product using an extruder to thereby extrude the pellets may be used as a raw material in order to increase the rate of reaction between the (A) component and the (B) component. In the blending ratio (mass ratio) of the (A) component and the (B) component in this pre-blending, the ratio of the (B) component in 100 mass % of the blended product of the (A) component and the (B) component is preferably in a range of from 0.05 mass % to 10 mass %, more preferably in a range of from 0.1 mass % to 5 mass %, and even more preferably in a range of from 0.3 mass % to 3 mass %. A blend containing the (B) component with a ratio of at least 0.05 mass % is preferable from a viewpoint of sufficiently enhancing performance and a blend containing the (B) component with a ratio of no greater than 10 mass % is preferable from a viewpoint of maintaining stability in extrusion processing.

[Molded Article]

The light reflective part and reflective part for an automobile lamp of the present embodiment that are formed from a resin composition can be obtained through molding of the resin composition described above.

Examples of methods that can be used to mold the resin composition include, but are not limited to, injection molding, extrusion molding, vacuum molding, and pressure molding. However, injection molding is more suitable, particularly from a viewpoint of molding external appearance and brightness.

In terms of the molding temperature during molding of the resin composition, a barrel setting maximum temperature is preferably in a range of from 250° C. to 340° C., more preferably in a range of from 270° C. to 330° C., and even more preferably in a range of from 280° C. to 320° C. The molding temperature is preferably at least 250° C. in order to enable sufficient molding processability and is preferably no higher than 340° C. from a viewpoint of suppressing heat degradation of the resin.

The mold temperature in molding of the resin composition is preferably in a range of from 40° C. to 170° C., more preferably in a range of from 80° C. to 150° C., and even more preferably in a range of from 80° C. to 130° C. The mold temperature is preferably at least 40° C. from a viewpoint of sufficiently maintaining molded article external appearance and is preferably no higher than 170° C. from a viewpoint of molding stability.

In the light reflective part (molded article) and reflective part for an automobile lamp of the present embodiment, the formation of depressions in the surface of an aluminum vapor deposited molded article that occurs upon long-term exposure to high-temperature conditions is suppressed such that the vapor deposited aluminum surface has excellent external appearance that has not conventionally been achieved. Accordingly, the light reflective part and the reflective part for an automobile lamp of the present embodiment are particularly suitable as a reflector molding or extension molding of an automobile lamp.

EXAMPLES

The following provides a more specific description of the present embodiment through examples and comparative examples. However, the present embodiment is not limited just to the following examples. Raw materials and methods used for measuring physical properties in the examples and comparative examples were as follows.

[Preparation of Aluminum Vapor Deposited Molded Article and Methods for Measuring Physical Properties Thereof]

1. Preparation of Aluminum Vapor Deposited Molded Article

Pellets of a resin composition obtained in each of Examples 1-19 and Comparative Examples 1-8 described below were dried for 3 hours in a 100° C. hot-air dryer. The dried pellets were then molded to form a molded plate using an injection molding machine (IS-80EPN produced by Toshiba Machine Co., Ltd.) equipped with a film gate mirror surface mold measuring 100 mm×100 mm×2 mm in thickness and having a #5000 polished mold surface. The molding was carried out with a cylinder temperature of 320° C., a mold temperature of 120° C., an injection pressure (gauge pressure) of 70 MPa, and an injection speed (panel setting) of 85%. The resultant molded plate was placed in a vapor deposition device in a vacuum state, and an inert gas and oxygen were introduced into the vapor deposition device. The inside of a chamber of the vapor deposition device was set in a plasma state and plasma treatment was carried out to activate the surface of the molded plate. Aluminum vapor deposition was then carried out inside the vapor deposition device under vacuum. Moreover, plasma polymerization treatment was carried out to form a silicon dioxide polymerized film as a protective film for the vapor deposited aluminum surface. The aluminum film thickness was 80 nm and the silicon dioxide film thickness was 50 nm.

2. Implementation Method of Aging Test

In a situation in which light from lighting equipment is shone onto the resultant aluminum vapor deposited molded plate from a vapor deposited aluminum surface side thereof, this light can be seen through the molded plate at locations corresponding to fine points that are not covered by the aluminum film (hereinafter, also referred to as "pin holes"). For each sample aluminum vapor deposited molded plate, five pin holes were selected at random from those present in the molded plate and were marked using a marker pen at a rear surface relative to aluminum vapor deposition. Each sample aluminum vapor deposited molded plate was then placed in a hot air oven set to 150° C. and was left for either 500 hours or 1,000 hours.

3. Evaluation of External Appearance of Aluminum Vapor Deposited Molded Article after Aging (Visual Judgment)

After 1,000 hours had passed, each of the sample aluminum vapor deposited molded plates was removed from the hot air oven and the external appearance of the vapor deposited aluminum surface thereof was visually judged after the molded plate had been left for 24 hours at 23° C. A judgment of "good" was made when depressions did not stand out and it was hard to identify any difference compared to before the aging, a judgment of "average" was made when depressions did not stand out but there was clouding of the surface, and a judgment of "poor" was made when, compared to before the aging, there was clear formation of depressions and deterioration of external appearance to a non-acceptable level. In terms of an evaluation standard, a sample given a judgment of "good" is suitable as a molded article for the applications described herein.

4. Measurement of Depth at Deepest Part of Recess in Vapor Deposited Aluminum Surface after Aging With respect to each of the sample aluminum vapor deposited molded plates that had been left for 500 hours or 1,000 hours, the depth at a deepest part of a depression that had formed at each of the five pin hole locations, which had been marked in advance using the marker pen, was measured using a laser microscope VR-3000 (produced by Keyence Corporation), and an average value of the measured values for the five locations was calculated.

Note that the measured values for these five locations prior to aging was 0 μm for each of the samples.

In terms of an evaluation standard, a smaller value for the depth at the deepest part was judged to be advantageous for use as a molded article in the applications described herein since a smaller value indicates that depressions stand out less and that external appearance is better.

[Raw Materials]
<Polyphenylene Ether (A)>
(A-1)
Poly(2,6-dimethyl-1,4-phenylene ether) (hereinafter, also referred to as "A-1") having a reduced viscosity of 0.38 dL/g (measured at 30° C. using chloroform solvent)
(A-2)
A powder of poly(2,6-dimethyl-1,4-phenylene ether) (PPE-1) having a reduced viscosity of 0.38 dL/g (measured by an Ubbelohde viscometer at 30° C. using 0.5 g/dL chloroform solution), a number average molecular weight of 15,300, 0.72 terminal OH groups per 100 units, and 0.43 N,N-dibutylaminomethyl groups per 100 units was prepared by solution polymerization.

A tumbler mixer was used to mix 99.5 parts by mass of the PPE-1 and 0.5 parts by mass of 9,10-dihydro-9-oxa-10-phosphaphenanthrene-10-oxide (produced by Sanko Co., Ltd.). The resultant powder mixture was fed from a furthest upstream section (top feed) of a TEM-58SS twin-screw extruder (produced by Toshiba Machine Co., Ltd., barrels: 13, screw diameter: 58 mm, L/D=53; screw pattern including kneading discs L: 2, kneading discs R: 14, and kneading discs N: 2) and was melt-kneaded to obtain pellets (A-2) (hereinafter, also referred to as "A-2") under conditions of a cylinder temperature of 300° C., a screw rotation speed of 400 rpm, an extrusion rate of 400 kg/hr, and a vent degree of vacuum of 7.998 kPa (60 Torr).

The obtained A-2 was dissolved in chloroform and was then reprecipitated using methanol to extract a polyphenylene ether component. Thereafter, vacuum drying was carried out for 4 hours at 60° C. to obtain a powder of the polyphenylene ether.

It was possible to identify the resultant polyphenylene ether powder by $^{31}$P-NMR (single-pulse method) and $^{1}$H-NMR. The added amount of the reactive compound was obtained by dividing an integral value for a peak appearing at from 2.8 ppm to 3.6 ppm in $^{1}$H-NMR by an integral value for a peak appearing at from 6.0 ppm to 7.0 ppm, which originates from aromatic rings of the polyphenylene ether. It was confirmed that the total number of structures represented by chemical formulae (9) and (10), shown below, that were included per 100 monomer units of the polyphenylene ether chain was 0.13.

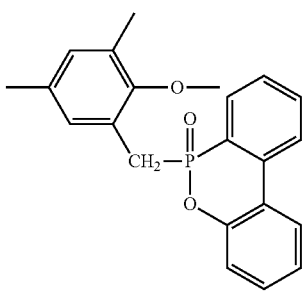

(9)

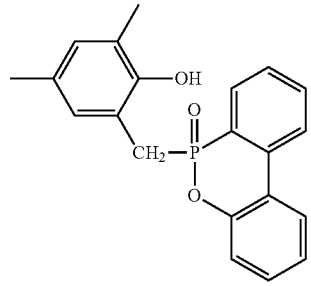

(10)

$^{31}$P-NMR Measurement Conditions
  Device: JEOL RESONANCE ECS400
  Observed nucleus: $^{31}$P
  Observation frequency: 161.8 MHz
  Pulse width: 45°
  Wait time: 5 secs
  Number of integrations: 10,000
  Solvent: CDCl$_3$
  Sample concentration: 20 w/v %
  Chemical shift standard: 85% phosphoric acid aqueous solution (external standard) 0 ppm
$^{1}$H-NMR Measurement Conditions
  Device: JEOL ECA 500
  Observed nucleus: $^{1}$H
  Observation frequency: 500.16 MHz
  Measurement method: Single-pulse
  Pulse width: 7 μsecs
  Wait time: 5 secs
  Number of integrations: 512
  Solvent: CDCl$_3$
  Sample concentration: 5 w %
  Chemical shift standard: TMS 0.00 ppm Measurement of polyphenylene ethers by $^{31}$P-NMR and $^{1}$H-NMR described below was also carried out using the above conditions.

(A-3)
A powder of poly(2,6-dimethyl-1,4-phenylene ether) (PPE-2) having a reduced viscosity of 0.47 dL/g (measured by an Ubbelohde viscometer at 30° C. using 0.5 g/dL chloroform solution), a number average molecular weight of 17,000, 0.51 terminal OH groups per 100 units, and 3.77 N,N-dibutylaminomethyl groups per 100 units was prepared by solution polymerization.

A tumbler mixer was used to mix 95.0 parts by mass of the PPE-2 and 5.0 parts by mass of 9,10-dihydro-9-oxa-10-phosphaphenanthrene-10-oxide (produced by Sanko Co., Ltd.). The resultant powder mixture was fed from a furthest upstream section (top feed) of a TEM-58SS twin-screw extruder (produced by Toshiba Machine Co., Ltd., barrels: 13, screw diameter: 58 mm, L/D=53; screw pattern including kneading discs L: 2, kneading discs R: 14, and kneading discs N: 2) and was melt-kneaded to obtain pellets (A-3) (hereinafter, also referred to as "A-3") under conditions of a cylinder temperature of 300° C., a screw rotation speed of 400 rpm, an extrusion rate of 400 kg/hr, and a vent degree of vacuum of 7.998 kPa (60 Torr).

The obtained A-3 was dissolved in chloroform and was then reprecipitated using methanol to extract a polyphenylene ether component. Thereafter, vacuum drying was carried out for 4 hours at 60° C. to obtain a powder of the polyphenylene ether.

It was possible to identify the resultant polyphenylene ether powder by $^{31}$P-NMR (single-pulse method) and $^1$H-NMR. The added amount of the reactive compound was obtained by dividing an integral value for a peak appearing at from 2.8 ppm to 3.6 ppm in $^1$H-NMR by an integral value for a peak appearing at from 6.0 ppm to 7.0 ppm, which originates from aromatic rings of the polyphenylene ether. It was confirmed that the total number of structures represented by chemical formulae (9) and (10) that were included per 100 monomer units of the polyphenylene ether chain was 3.12.

(A-4)

A tumbler mixer was used to mix 99.0 parts by mass of the PPE-1 and 1.0 parts by mass of dioctyl phosphonate (produced by Johoku Chemical Co., Ltd.). The resultant powder mixture was fed from a furthest upstream section (top feed) of a TEM-58SS twin-screw extruder (produced by Toshiba Machine Co., Ltd., barrels: 13, screw diameter: 58 mm, L/D=53; screw pattern including kneading discs L: 2, kneading discs R: 14, and kneading discs N: 2) and was melt-kneaded to obtain pellets (A-4) (hereinafter, also referred to as "A-4") under conditions of a cylinder temperature of 300° C., a screw rotation speed of 400 rpm, an extrusion rate of 400 kg/hr, and a vent degree of vacuum of 7.998 kPa (60 Torr).

The obtained A-4 was dissolved in chloroform and was then reprecipitated using methanol to extract a polyphenylene ether component. Thereafter, vacuum drying was carried out for 4 hours at 60° C. to obtain a powder of the polyphenylene ether.

It was possible to identify the resultant polyphenylene ether powder by $^{31}$P-NMR (single-pulse method) and $^1$H-NMR. The added amount of the reactive compound was obtained by dividing an integral value for a peak appearing at from 2.8 ppm to 3.6 ppm in $^1$H-NMR by an integral value for a peak appearing at from 6.0 ppm to 7.0 ppm, which originates from aromatic rings of the polyphenylene ether. It was confirmed that the total number of structures represented by chemical formulae (11) and (12) that were included per 100 monomer units of the polyphenylene ether was 0.25.

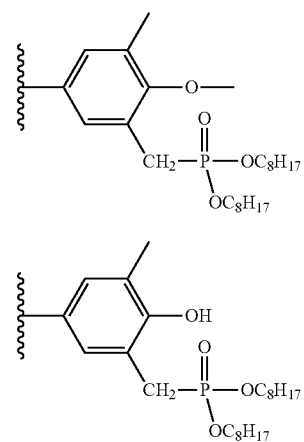

(A-5)

A solution was prepared by dissolving 98.5 parts by mass of the PPE-1, 0.1 parts by mass of N-hydroxyphthalimide (produced by Tokyo Chemical Industry Co., Ltd.), 0.5 parts by mass of triethylamine (produced by Tokyo Chemical Industry Co., Ltd.), and 1.0 parts by mass of methanesulfonyl chloride (produced by Tokyo Chemical Industry Co., Ltd.) in 10 L of chloroform, and was stirred for 5 hours at 60° C. The resultant reaction solution was neutralized with sodium hydrogen carbonate aqueous solution and an organic layer was obtained by carrying out a liquid separation operation. Methanol was gradually added to the resultant organic layer to cause precipitation of a PPE component that was subsequently filtered off and dried to extract a polyphenylene ether component (A-5). Thereafter, vacuum drying was carried out for 4 hours at 60° C. to obtain a powder of the polyphenylene ether (A-5) (hereinafter, also referred to as "A-5").

It was possible to identify the resultant A-5 by $^1$H-NMR and $^{13}$C-NMR. The added amount of the reactive compound was obtained by dividing an integral value for a peak appearing at from 2.8 ppm to 3.6 ppm in $^1$H-NMR by an integral value for a peak appearing at from 6.0 ppm to 7.0 ppm, which originates from aromatic rings of the polyphenylene ether. It was confirmed that the total number of structures represented by chemical formulae (13) and (14) that were included per 100 monomer units of the polyphenylene ether was 0.3.

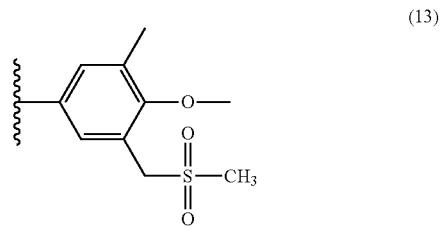

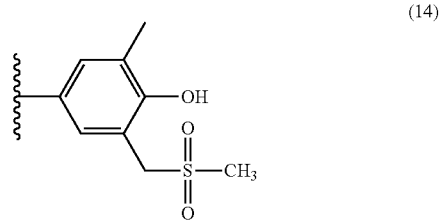

$^{13}$C-NMR Measurement Conditions

Device: Bruker Biospin Avance 600
Observed nucleus: $^{13}$C
Observation frequency: 150.9 MHz
Measurement method: Inverse gated decoupling
Pulse width: 30°
Wait time: 10 secs
Number of integrations: 2,000
Solvent: CDCl$_3$
Sample concentration: 20 w/v %
Chemical shift standard: TMS 0 ppm <Compound (B)>

(B-1)

Chemical name: 9,10-dihydro-9-oxa-10-phosphaphenanthrene-10-oxide, product name: HCA® (HCA is a registered trademark in Japan, other countries, or both), produced by Sanko Co., Ltd. (hereinafter, also referred to as "B-1")

(B-2)

Chemical name: 10-(2,5-dihydroxyphenyl)-9,10-dihydro-9-oxa-10-phosphaphenanthrene-10-oxide, product name: HCA-HQ® (HCA-HQ is a registered trademark in Japan, other countries, or both), produced by Sanko Co., Ltd. (hereinafter, also referred to as "B-2")

(B-3)

Chemical name: dioctyl phosphonate, produced by Johoku Chemical Co., Ltd. (hereinafter, also referred to as "B-3")

<Antioxidant (C)>

(C-1)

Phosphorus-containing antioxidant (chemical name: 3,9-bis(2,6-di-tert-butyl-4-methylphenoxy)-2,4,8,10-tetraoxa-3,9-diphosphaspiro[5,5]undecane, produced by ADEKA Corporation, product name: ADK STAB PEP-36® (ADK STAB PEP-36 is a registered trademark in Japan, other countries, or both)) (hereinafter, also referred to as "C-1")

(C-2)

Phosphorus-containing antioxidant (chemical name: tris (2,4-di-tert-butylphenyl) phosphite, produced by BASF, product name: Irgafos 168° (Irgafos 168 is a registered trademark in Japan, other countries, or both)) (hereinafter, also referred to as "C-2")

<Styrene Resin>

General purpose polystyrene, product name: Polystyrene 680° (Polystyrene 680 is a registered trademark in Japan, other countries, or both), produced by Asahi Kasei Chemicals Corporation (hereinafter, also referred to as "GPPS")

<Elastomer Component>

Triblock hydrogenated block copolymer including polystyrene blocks and hydrogenated butadiene blocks having a hydrogenation rate of 98%; weight average molecular weight 71,200; bound styrene content 32 mass % (hereinafter, also referred to as "the elastomer")

Comparative Example 1

100 mass % of A-1 was fed from a furthest upstream section (top feed) of a TEM-58SS twin-screw extruder (produced by Toshiba Machine Co., Ltd., barrels: 13, screw diameter: 58 mm, L/D=53; screw pattern including kneading discs L: 2, kneading discs R: 14, and kneading discs N: 2) and was melt-kneaded to obtain a resin composition under conditions of a cylinder temperature of 300° C., a screw rotation speed of 400 rpm, an extrusion rate of 400 kg/hr, and a vent degree of vacuum of 7.998 kPa (60 Torr). Evaluation results for a molded article containing the resultant resin composition are shown below in Table 1.

Comparative Example 2

A pre-prepared mixture of 99.97 mass % of A-1 and 0.03 mass % of B-1 was melt-kneaded to obtain a resin composition in the same way as in Comparative Example 1. Evaluation results for a molded article containing the resultant resin composition are shown below in Table 1.

Example 1

A pre-prepared mixture of 99.95 mass % of A-1 and 0.05 mass % of B-1 was melt-kneaded to obtain a resin composition in the same way as in Comparative Example 1. Evaluation results for a molded article containing the resultant resin composition are shown below in Table 1.

Example 2

A pre-prepared mixture of 99.9 mass % of A-1 and 0.1 mass % of B-1 was melt-kneaded to obtain a resin composition in the same way as in Comparative Example 1. Evaluation results for a molded article containing the resultant resin composition are shown below in Table 1.

Example 3

A pre-prepared mixture of 99.7 mass % of A-1 and 0.3 mass % of B-1 was melt-kneaded to obtain a resin composition in the same way as in Comparative Example 1. Evaluation results for a molded article containing the resultant resin composition are shown below in Table 1.

Example 4

A pre-prepared mixture of 99.5 mass % of A-1 and 0.5 mass % of B-1 was melt-kneaded to obtain a resin composition in the same way as in Comparative Example 1. Evaluation results for a molded article containing the resultant resin composition are shown below in Table 1.

The resultant molded article was dissolved in chloroform and was then reprecipitated using methanol to extract a polyphenylene ether component. Thereafter, vacuum drying was carried out for 4 hours at 60° C. to obtain a powder of the polyphenylene ether.

It was possible to identify the resultant polyphenylene ether powder by $^{31}$P-NMR (single-pulse method) and $^{1}$H-NMR. The added amount of the reactive compound was obtained by dividing an integral value for a peak appearing at from 2.8 ppm to 3.6 ppm in $^{1}$H-NMR by an integral value for a peak appearing at from 6.0 ppm to 7.0 ppm, which originates from aromatic rings of the polyphenylene ether. It was confirmed that the total number of structures represented by chemical formulae (9) and (10), shown below, that were included per 100 monomer units of the polyphenylene ether chain was 0.13.

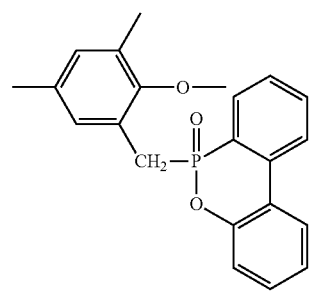

(9)

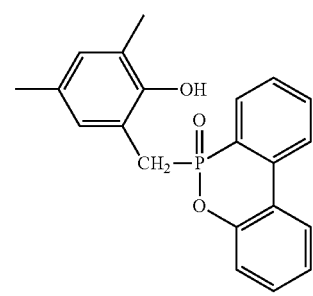

(10)

Example 5

A pre-prepared mixture of 99 mass % of A-1 and 1 mass % of B-1 was melt-kneaded to obtain a resin composition in the same way as in Comparative Example 1. Evaluation results for a molded article containing the resultant resin composition are shown below in Table 1.

Example 6

A pre-prepared mixture of 98 mass % of A-1 and 2 mass % of B-1 was melt-kneaded to obtain a resin composition in the same way as in Comparative Example 1. Evaluation results for a molded article containing the resultant resin composition are shown below in Table 1.

Example 7

A pre-prepared mixture of 95 mass % of A-1 and 5 mass % of B-1 was melt-kneaded to obtain a resin composition in the same way as in Comparative Example 1. Evaluation results for a molded article containing the resultant resin composition are shown below in Table 1.

The resultant molded article was dissolved in chloroform and was then reprecipitated using methanol to extract a polyphenylene ether component. Thereafter, vacuum drying was carried out for 4 hours at 60° C. to obtain a powder of the polyphenylene ether.

It was possible to identify the resultant polyphenylene ether powder by $^{31}$P-NMR (single-pulse method) and $^1$H-NMR. The added amount of the reactive compound was obtained by dividing an integral value for a peak appearing at from 2.8 ppm to 3.6 ppm in $^1$H-NMR by an integral value for a peak appearing at from 6.0 ppm to 7.0 ppm, which originates from aromatic rings of the polyphenylene ether. It was confirmed that the total number of structures represented by chemical formulae (9) and (10) that were included per 100 monomer units of the polyphenylene ether chain was 3.12.

Comparative Example 3

A pre-prepared mixture of 93 mass % of A-1 and 7 mass % of B-1 was melt-kneaded to obtain a resin composition in the same way as in Comparative Example 1. Evaluation results for a molded article containing the resultant resin composition are shown below in Table 1.

Comparative Example 4

A resin composition was obtained in the same way as in Example 5 with the exception that B-1 was replaced with B-2. Evaluation results for a molded article containing the resultant resin composition are shown below in Table 1.

Comparative Example 5

A pre-prepared mixture of 99 mass % of A-1 and 1 mass % of B-3 was melt-kneaded to obtain a resin composition in the same way as in Comparative Example 1. Evaluation results for a molded article containing the resultant resin composition are shown below in Table 1.

The resultant molded article was dissolved in chloroform and was then reprecipitated using methanol to extract a polyphenylene ether component. Thereafter, vacuum drying was carried out for 4 hours at 60° C. to obtain a powder of the polyphenylene ether.

It was possible to identify the resultant polyphenylene ether powder by $^{31}$P-NMR (single-pulse method) and $^1$H-NMR. The added amount of the reactive compound was obtained by dividing an integral value for a peak appearing at from 2.8 ppm to 3.6 ppm in $^1$H-NMR by an integral value for a peak appearing at from 6.0 ppm to 7.0 ppm, which originates from aromatic rings of the polyphenylene ether. It was confirmed that the total number of structures represented by chemical formulae (11) and (12) that were included per 100 monomer units of the polyphenylene ether was 0.25.

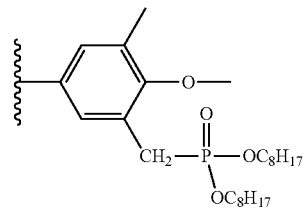

(11)

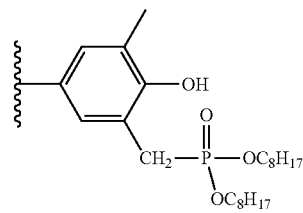

(12)

Example 8

A pre-prepared mixture of 99.9 mass % of A-2 and 0.1 mass % of B-1 was melt-kneaded to obtain a resin composition in the same way as in Comparative Example 1. Evaluation results for a molded article containing the resultant resin composition are shown below in Table 1.

Example 9

A pre-prepared mixture of 99.95 mass % of A-3 and 0.05 mass % of B-1 was melt-kneaded to obtain a resin composition in the same way as in Comparative Example 1. Evaluation results for a molded article containing the resultant resin composition are shown below in Table 1.

Comparative Example 6

A pre-prepared mixture of 99.5 mass % of A-4 and 0.5 mass % of B-2 was melt-kneaded to obtain a resin composition in the same way as in Comparative Example 1. Evaluation results for a molded article containing the resultant resin composition are shown below in Table 1.

Comparative Example 7

A pre-prepared mixture of 99.5 mass % of A-5 and 0.5 mass % of B-2 was melt-kneaded to obtain a resin composition in the same way as in Comparative Example 1. Evaluation results for a molded article containing the resultant resin composition are shown below in Table 1.

Example 10

A pre-prepared mixture of 99 mass % of A-1, 0.5 mass % of B-1, and 0.5 mass % of C-1 was melt-kneaded to obtain a resin composition in the same way as in Comparative Example 1. Evaluation results for a molded article containing the resultant resin composition are shown below in Table 1.

Comparative Example 8

A resin composition was obtained in the same way as in Example 5 with the exception that B-1 was replaced with maleic anhydride (product name: Maleic anhydride, produced by Mitsubishi Chemical Corporation). Evaluation results for a molded article containing the resultant resin composition are shown below in Table 1.

Comparative Example 9

A resin composition was obtained in the same way as in Example 5 with the exception that B-1 was replaced with stearyl acrylate (product name: STA, produced by Osaka Organic Chemical Industry Ltd.). Evaluation results for a molded article containing the resultant resin composition are shown below in Table 1.

Comparative Example 10

A pre-prepared mixture of 98.5 mass % of A-1, 1 mass % of stearyl acrylate (product name: STA®, produced by Osaka Organic Chemical Industry Ltd.), and 0.5 mass % of C-1 was melt-kneaded to obtain a resin composition in the same way as in Comparative Example 1. Evaluation results for a molded article containing the resultant resin composition are shown below in Table 1.

Comparative Example 11

A pre-prepared mixture of 70 mass % of A-1, 25 mass % of GPPS, and 5 mass % of the elastomer was fed from a furthest upstream section (top feed) of a TEM-58SS twin-screw extruder (produced by Toshiba Machine Co., Ltd., barrels: 13, screw diameter: 58 mm, L/D=53; screw pattern including kneading discs L: 2, kneading discs R: 14, and kneading discs N: 2) and was melt-kneaded to obtain a resin composition under conditions of a cylinder temperature of 300° C., a screw rotation speed of 400 rpm, an extrusion rate of 400 kg/hr, and a vent degree of vacuum of 7.998 kPa (60 Torr). Evaluation results for a molded article containing the resultant resin composition are shown below in Table 2.

Example 11

A pre-prepared mixture of 70 mass % of A-1, 0.7 mass % of B-1, 24.3 mass % of GPPS, and 5 mass % of the elastomer was used to obtain a resin composition in the same way as in Comparative Example 11. Evaluation results for a molded article containing the resultant resin composition are shown below in Table 2.

Example 12

A pre-prepared mixture of 70 mass % of A-1, 0.35 mass % of B-1, 0.35 mass % of C-1, 24.3 mass % of GPPS, and 5 mass % of the elastomer was used to obtain a resin composition in the same way as in Comparative Example 11. Evaluation results for a molded article containing the resultant resin composition are shown below in Table 2.

Example 13

A pre-prepared mixture of 70 mass % of A-1, 0.7 mass % of B-2, 24.3 mass % of GPPS, and 5 mass % of the elastomer was used to obtain a resin composition in the same way as in Comparative Example 11. Evaluation results for a molded article containing the resultant resin composition are shown below in Table 2.

Comparative Example 12

A pre-prepared mixture of 60 mass % of A-1, 32 mass % of GPPS, and 8 mass % of the elastomer was fed from a furthest upstream section (top feed) of a TEM-58SS twin-screw extruder (produced by Toshiba Machine Co., Ltd., barrels: 13, screw diameter: 58 mm, L/D=53; screw pattern including kneading discs L: 2, kneading discs R: 14, and kneading discs N: 2) and was melt-kneaded to obtain a resin composition under conditions of a cylinder temperature of 300° C., a screw rotation speed of 400 rpm, an extrusion rate of 400 kg/hr, and a vent degree of vacuum of 7.998 kPa (60 Torr). Evaluation results for a molded article containing the resultant resin composition are shown below in Table 2.

Example 14

A pre-prepared mixture of 60 mass % of A-1, 0.6 mass % of B-1, 31.4 mass % of GPPS, and 8 mass % of the elastomer was used to obtain a resin composition in the same way as in Comparative Example 11. Evaluation results for a molded article containing the resultant resin composition are shown below in Table 2.

Example 15

A pre-prepared mixture of 60 mass % of A-1, 0.3 mass % of B-1, 0.3 mass % of C-2, 31.4 mass % of GPPS, and 8 mass % of the elastomer was used to obtain a resin composition in the same way as in Comparative Example 11. Evaluation results for a molded article containing the resultant resin composition are shown below in Table 2.

TABLE 1

|  |  |  | Comparative Example 1 | Comparative Example 2 | Example 1 | Example 2 | Example 3 | Example 4 |
|---|---|---|---|---|---|---|---|---|
| Polyphenylene ether (A) | A-1 | Mass % | 100 | 99.97 | 99.95 | 99.9 | 99.7 | 99.5 |
|  | A-2 | Mass % |  |  |  |  |  |  |
|  | A-3 | Mass % |  |  |  |  |  |  |
|  | A-4 | Mass % |  |  |  |  |  |  |
|  | A-5 | Mass % |  |  |  |  |  |  |
| Compound (B) | B-1 | Mass % |  | 0.03 | 0.05 | 0.1 | 0.3 | 0.5 |
|  | B-2 | Mass % |  |  |  |  |  |  |
|  | B-3 | Mass % |  |  |  |  |  |  |

TABLE 1-continued

| | | | | | | | | |
|---|---|---|---|---|---|---|---|---|
| Antioxidant (C) | C-1 | Mass % | | | | | | |
| Other materials | Maleic anhydride | Mass % | | | | | | |
| | Stearyl acrylate | Mass % | | | | | | |
| Total | | Mass % | 100 | 100 | 100 | 100 | 100 | 100 |
| Content of (A) component relative to 100 mass %, in total, of (A) and (B) components | | Mass % | 100 | 99.97 | 99.95 | 99.9 | 99.7 | 99.5 |
| Content of (B) component relative to 100 mass %, in total, of (A) and (B) components | | Mass % | 0 | 0.03 | 0.05 | 0.1 | 0.3 | 0.5 |
| Visual evaluation of aluminum vapor deposited molded article external appearance (after 1,000 hr aging at 150° C.) | | — | Poor | Poor | Good | Good | Good | Good |
| Depth (μm) at deepest part of pin holes after 500 hr aging at 150° C. | | μm | 16 | 5 | 2 | 2 | 2 | 1 |
| Depth (μm) at deepest part of pin holes after 1,000 hr aging at 150° C. | | μm | 22 | 10 | 4 | 3 | 2 | 2 |

| | | | Example 5 | Example 6 | Example 7 | Comparative Example 3 |
|---|---|---|---|---|---|---|
| Polyphenylene ether (A) | A-1 | Mass % | 99 | 98 | 95 | 93 |
| | A-2 | Mass % | | | | |
| | A-3 | Mass % | | | | |
| | A-4 | Mass % | | | | |
| | A-5 | Mass % | | | | |
| Compound (B) | B-1 | Mass % | 1 | 2 | 5 | 7 |
| | B-2 | Mass % | | | | |
| | B-3 | Mass % | | | | |
| Antioxidant (C) | C-1 | Mass % | | | | |
| Other materials | Maleic anhydride | Mass % | | | | |
| | Stearyl acrylate | Mass % | | | | |
| Total | | Mass % | 100 | 100 | 100 | 100 |
| Content of (A) component relative to 100 mass %, in total, of (A) and (B) components | | Mass % | 99 | 98 | 95 | 93 |
| Content of (B) component relative to 100 mass %, in total, of (A) and (B) components | | Mass % | 1 | 2 | 5 | 7 |
| Visual evaluation of aluminum vapor deposited molded article external appearance (after 1,000 hr aging at 150° C.) | | — | Good | Good | Good | Average |
| Depth (μm) at deepest part of pin holes after 500 hr aging at 150° C. | | μm | 1 | 0 | 2 | 2 |
| Depth (μm) at deepest part of pin holes after 1,000 hr aging at 150° C. | | μm | 1 | 0 | 2 | 2 |

| | | | Example 8 | Example 9 | Example 10 | Example 11 | Example 12 | Example 13 |
|---|---|---|---|---|---|---|---|---|
| Polyphenylene ether (A) | A-1 | Mass % | 99 | 99 | | | | |
| | A-2 | Mass % | | | 99.9 | | | |
| | A-3 | Mass % | | | | 99.95 | | |
| | A-4 | Mass % | | | | | 99.5 | |
| | A-5 | Mass % | | | | | | 99.5 |
| Compound (B) | B-1 | Mass % | | | 0.1 | 0.05 | | |
| | B-2 | Mass % | 1 | | | | 0.5 | 0.5 |
| | B-3 | Mass % | | 1 | | | | |
| Antioxidant (C) | C-1 | Mass % | | | | | | |
| Other materials | Maleic anhydride | Mass % | | | | | | |
| | Stearyl acrylate | Mass % | | | | | | |
| Total | | Mass % | 100 | 100 | 100 | 100 | 100 | 100 |
| Content of (A) component relative to 100 mass % in total, of (A) and (B) components | | Mass % | 99 | 99 | 99.9 | 99.95 | 99.5 | 99.5 |
| Content of (B) component relative to 100 mass %, in total, of (A) and (B) components | | Mass % | 1 | 1 | 0.1 | 0.05 | 0.5 | 0.5 |
| Visual evaluation of aluminum vapor deposited molded article external appearance (after 1,000 hr aging at 150° C.) | | — | Good | Good | Good | Good | Good | Good |
| Depth (μm) at deepest part of pin holes after 500 hr aging at 150° C. | | μm | 1 | 2 | 0 | 0 | 0 | 1 |
| Depth (μm) at deepest part of pin holes after 1,000 hr aging at 150° C. | | μm | 2 | 4 | 0 | 0 | 1 | 3 |

| | | | Example 14 | Comparative Example 4 | Comparative Example 5 | Comparative Example 6 |
|---|---|---|---|---|---|---|
| Polyphenylene ether (A) | A-1 | Mass % | 99 | 99 | 99 | 98.5 |
| | A-2 | Mass % | | | | |
| | A-3 | Mass % | | | | |

TABLE 1-continued

|  |  |  | | | | |
|---|---|---|---|---|---|---|
|  | A-4 | Mass % | | | | |
|  | A-5 | Mass % | | | | |
| Compound (B) | B-1 | Mass % | 0.5 | | | |
|  | B-2 | Mass % | | | | |
|  | B-3 | Mass % | | | | |
| Antioxidant (C) | C-1 | Mass % | 0.5 | | | 0.5 |
| Other materials | Maleic anhydride | Mass % | | 1 | | |
|  | Stearyl acrylate | Mass % | | | 1 | 1 |
| Total | | Mass % | 100 | 100 | 100 | 100 |
| Content of (A) component relative to 100 mass % in total, of (A) and (B) components | | Mass % | 99.50 | 100 | 100 | 100 |
| Content of (B) component relative to 100 mass %, in total, of (A) and (B) components | | Mass % | 0.50 | 0 | 0 | 0 |
| Visual evaluation of aluminum vapor deposited molded article external appearance (after 1,000 hr aging at 150° C.) | | — | Good | Poor | Poor | Poor |
| Depth (μm) at deepest part of pin holes after 500 hr aging at 150° C. | | μm | 0 | 10 | 11 | 9 |
| Depth (μm) at deepest part of pin holes after 1,000 hr aging at 150° C. | | μm | 0 | 19 | 14 | 13 |

| Table 2 | | | Comparative Example 7 | Example 15 | Example 16 | Example 17 | Comparative Example 8 | Example 18 | Example 19 |
|---|---|---|---|---|---|---|---|---|---|
| Polyphenylene ether (A) | A-1 | Mass % | 70 | 70 | 70 | 70 | 60 | 60 | 60 |
| Compound (B) | B-1 | Mass % | | 0.7 | 0.35 | | | 0.6 | 0.3 |
|  | B-2 | Mass % | | | | 0.7 | | | |
| Antioxidant (C) | C-1 | Mass % | | | 0.35 | | | | |
|  | C-2 | Mass % | | | | | | | 0.3 |
| Styrene resin | GPPS | Mass % | 25 | 24.3 | 24.3 | 24.3 | 32 | 31.4 | 31.4 |
| Elastomer component | Elastomer | Mass % | 5 | 5 | 5 | 5 | 8 | 8 | 8 |
| Total | | Mass % | 100 | 100 | 100 | 100 | 100 | 100 | 100 |
| Content of (A) component relative to 100 mass %, in total, of (A) and (B) components | | Mass % | 100 | 99.01 | 99.50 | 99.01 | 100 | 99.01 | 99.50 |
| Content of (B) component relative to 100 mass %, in total, of (A) and (B) components | | Mass % | 0 | 0.99 | 0.50 | 0.99 | 0 | 0.99 | 0.50 |
| Visual evaluation of aluminum vapor deposited molded article external appearance (after 1,000 hr aging at 150° C.) | | — | Poor | Good | Good | Good | Poor | Good | Good |
| Depth (μm) at deepest part of pin holes after 500 hr aging at 150° C. | | μm | 11 | 0 | 0 | 0 | 8 | 0 | 0 |
| Depth (μm) at deepest part of pin holes after 1,000 hr aging at 150° C. | | μm | 16 | 0 | 0 | 1 | 14 | 0 | 0 |

As shown in Table 1, the molded articles formed from the resin compositions of Examples 1-15 each had a composition of the (A) component and the (B) component that was within the scope of the claims of the present application. As a result, the formation of depressions in the vapor deposited aluminum surface after long-term exposure to high temperatures was suppressed, the vapor deposited aluminum of the molded article had good external appearance, and the molded article was sufficiently favorable for use as a molded article in the applications described herein.

The molded articles formed from the resin compositions of Comparative Examples 1 and 2 each had a composition of the (A) component and the (B) component that was outside of the scope of the claims of the present application. As a result, the formation of depressions in the vapor deposited aluminum surface after long-term exposure to high temperatures was not sufficiently suppressed, the vapor deposited aluminum of the molded article had unsatisfactory external appearance, and it was judged that it would be problematic to use the molded article for the applications described herein.

The molded article formed from the resin composition of Comparative Example 3 had a composition of the (A) component and the (B) component that was outside of the scope of the claims of the present application and an amount of the (B) component that exceeded the upper limited stipulated in the present application. As a result, clouding of the vapor deposited aluminum surface of the molded article after aging was confirmed, the vapor deposited aluminum of the molded article had unsatisfactory external appearance, and it was judged that it would be problematic to use the molded article for the applications described herein.

The molded articles formed from the resin compositions of Comparative Examples 8 and 9 each had a different component to the (B) component of the present application compounded with the (A) component, and thus had a composition that was outside of the scope of the claims of the present application. As a result, the formation of depressions in the vapor deposited aluminum surface after long-term exposure to high temperatures was not sufficiently suppressed, the vapor deposited aluminum of the molded article had unsatisfactory external appearance, and it was judged that it would be problematic to use the molded article for the applications described herein.

The molded article formed from the resin composition of Comparative Example 10 also had a different component to the (B) component of the present application, and thus had a composition that was outside of the scope of the claims of the present application. As a result, even when a phosphorus-containing antioxidant was compounded as the (C) component of the present application, the formation of depressions in the vapor deposited aluminum surface after long-term exposure to high temperatures was not sufficiently suppressed, the vapor deposited aluminum of the molded article had unsatisfactory external appearance, and it was judged that it would be problematic to use the molded article for the applications described herein.

As shown in Table 2, the molded articles formed from the resin compositions of Examples 11-15 each had a composition of the (A) component and the (B) component that was within the scope of the claims of the present application. As a result, the formation of depressions in the vapor deposited aluminum surface after long-term exposure to high temperatures was suppressed, the vapor deposited aluminum of the molded article had good external appearance, and the molded article was sufficiently favorable for use as a molded article in the applications described herein. On the other hand, the molded articles formed from the resin compositions of Comparative Examples 11 and 12 each did not contain the (B) component of the present application. As a result, the formation of depressions in the vapor deposited aluminum surface after long-term exposure to high temperatures was not sufficiently suppressed, the vapor deposited aluminum of the molded article had unsatisfactory external appearance, and it was judged that it would be problematic to use the molded article for the applications described herein.

INDUSTRIAL APPLICABILITY

In a molded article formed from the presently disclosed resin composition, formation of depressions in a vapor deposited aluminum surface of the molded article that is caused by long-term exposure to high-temperature conditions is suppressed such that the vapor deposited aluminum surface of the molded article has excellent external appearance that has not conventionally been achieved. Therefore, the molded article can be favorably used for a molding for a light reflective part such as a reflector or an extension molding of an automobile lamp.

The invention claimed is:

1. A light reflective part comprising a polyphenylene ether resin composition containing
a polyphenylene ether (A), and
9,10-dihydro-9-oxa-10-phosphaphenanthrene-10-oxide or a derivative thereof (B), wherein
the (A) component has a content of from 95 mass % to 99.95 mass % and the (B) component has a content of from 0.05 mass % to 5 mass % relative to 100 mass %, in total, of the (A) component and the (B) component, and wherein
the polyphenylene ether resin composition is free of a sulfur-containing antioxidant.

2. The light reflective part of claim 1, wherein
the polyphenylene ether resin composition further contains from 0.05 mass % to 5 mass % of an antioxidant (C) relative to 100 mass % of the polyphenylene ether resin composition.

3. The light reflective part of claim 2, wherein
the antioxidant (C) is a phosphite antioxidant having a structure in chemical formula (5)

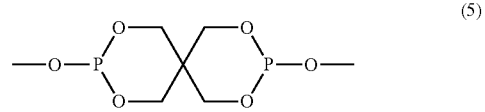

(5)

in molecules thereof.

4. The light reflective part of claim 1, wherein
the polyphenylene ether resin composition further contains from 5 mass % to 50 mass % of a styrene resin relative to 100 mass % of the polyphenylene ether resin composition.

5. The light reflective part of claim 1, wherein
the polyphenylene ether resin composition further contains from 1 mass % to 15 mass % of an elastomer component relative to 100 mass % of the polyphenylene ether resin composition.

6. A reflective part for an automobile lamp comprising the light reflective part of claim 1.

7. A molded article for a reflector part of an automobile lamp, the molded article comprising the reflective part for an automobile lamp of claim 6.

8. A molded article for an extension part of an automobile lamp, the molded article comprising the reflective part for an automobile lamp of claim 6.

* * * * *